(12) United States Patent
Chujo et al.

(10) Patent No.: US 9,954,209 B2
(45) Date of Patent: Apr. 24, 2018

(54) BATTERY PACK

(71) Applicant: KABUSHIKI KAISHA TOYOTA JIDOSHOKKI, Aichi-ken (JP)

(72) Inventors: Yuki Chujo, Kariya (JP); Takayuki Kato, Kariya (JP); Hiromi Ueda, Kariya (JP); Fumihiko Ishiguro, Kariya (JP)

(73) Assignee: KABUSHIKI KAISHA TOYOTA JIDOSHOKKI, Aichi-Ken ( * ) Notice: Subject to any disclaimer, the term of this patent is extended or adjusted under 35 U.S.C. 154(b) by 0 days.

(21) Appl. No.: 15/117,870

(22) PCT Filed: Feb. 10, 2015

(86) PCT No.: PCT/JP2015/053685
§ 371 (c)(1),
(2) Date: Aug. 10, 2016

(87) PCT Pub. No.: WO2015/125675
PCT Pub. Date: Aug. 27, 2015

(65) Prior Publication Data
US 2017/0012261 A1    Jan. 12, 2017

(30) Foreign Application Priority Data
Feb. 20, 2014   (JP) ................. 2014-030758

(51) Int. Cl.
*H01M 2/12* (2006.01)
*H01M 2/10* (2006.01)

(52) U.S. Cl.
CPC ....... *H01M 2/1241* (2013.01); *H01M 2/1016* (2013.01); *H01M 2/12* (2013.01); *H01M 2200/20* (2013.01)

(58) Field of Classification Search
CPC .. H01M 2200/20; H01M 2/1016; H01M 2/12; H01M 2/1241
See application file for complete search history.

(56) References Cited

U.S. PATENT DOCUMENTS 5,660,944 A    8/1997  Sprengel et al.
2013/0216874 A1  8/2013  Endo et al.

FOREIGN PATENT DOCUMENTS

CN  202749428    2/2013
DE  44 11 289    10/1995
(Continued)

OTHER PUBLICATIONS

Official Action in CN Appl. No. 201580009015.7 dated Mar. 3, 2017.
(Continued)

*Primary Examiner* — Ula C Ruddock
*Assistant Examiner* — Ben Lewis
(74) *Attorney, Agent, or Firm* — Greenblum & Bernstein, P.L.C.

(57) ABSTRACT

This battery pack is provided with a housing, a case, a battery cell, a sealing material and a spacer. The case includes a lid member fixed to the housing so as to close a through-hole in the housing. The lid member is bolted to a through-hole peripheral part of the housing. When the internal pressure of the case rises, part of the lid member deforms in a direction away from the through-hole peripheral part, releasing the internal pressure of the case. The battery cell is accommodated inside of the case. The sealing material is arranged between the lid member and the through-hole peripheral part so as to ensure the air-tightness of the case. The spacer is arranged between the lid member (Continued)

and the through-hole peripheral part so as to maintain the interval between the lid member and the through-hole peripheral part.

10 Claims, 3 Drawing Sheets

(56) References Cited

FOREIGN PATENT DOCUMENTS

| JP | 2012-113899 | | 6/2012 | | |
|---|---|---|---|---|---|
| JP | 2013-089375 | * | 5/2013 | ............. | H01M 2/12 |
| JP | 2013-89375 | | 5/2013 | | |
| JP | 2013-171796 | | 9/2013 | | |
| JP | 2014-17270 | | 1/2014 | | |
| JP | 2014-107178 | | 6/2014 | | |
| WO | 2012/149948 | | 11/2012 | | |

OTHER PUBLICATIONS

Written Opinion of the International Searching Authority, including English-language translation thereof, for PCT/JP2015/053685 dated Apr. 28, 2015.
Official Action in DE Appl. No. 11 2015 000 912.4 dated Jun. 19, 2017.

* cited by examiner

BATTERY PACK

TECHNICAL FIELD

The present invention relates to a battery pack that accommodates a battery cell in a case.

BACKGROUND ART

Patent document 1 discloses an example of a battery module that accommodates battery cells that are connected and integrated with one another in a frame.

PRIOR ART DOCUMENT

Patent Document

Patent Document 1: Japanese Laid-Open Patent Publication No. 2013-171796

SUMMARY OF THE INVENTION

Problems to be Solved by the Invention

Each battery cell of patent document 1 includes a discharge valve that discharges gas, which is generated in the battery cell, out of the battery cell. However, when gas is discharged from the battery cell and into the frame, the pressure in the frame increases. This may damage the frame.

It is an object of the present invention to provide a battery pack that limits excessive increases in the pressure of the frame while ensuring hermetic sealing of the frame.

Means for Solving the Problem

A battery pack that solves the above problem is provided with a case including a frame, which has a through hole, and a lid, which is fixed to the frame to close the through hole. The frame includes a through hole surrounding portion that surrounds the through hole. The lid is fixed to the through hole surrounding portion by a bolt. When internal pressure of the case rises, a portion of the lid is deformed in a direction in which the portion is separated from the through hole surrounding portion to relieve the internal pressure. A battery cell is accommodated in the case. A seal is located between the lid and the through hole surrounding portion to hermetically seal the case. A spacer is located between the lid and the through hole surrounding portion to maintain a gap between the lid and the through hole surrounding portion.

In the above structure, the seal hermetically seals the case. Further, when the internal pressure of the case rises, the lid deforms and relieves the internal pressure of the case.

When the tightening force of the bolt compresses the seal, the above structure hermetically seals the case. However, depending on the tightening force of the bolt, the compression ratio of the seal may be insufficient and result in insufficient hermetic sealing of the case. Alternatively, the seal may be damaged if excessively compressed.

In this regard, the spacer restricts movement of the lid toward the through hole surrounding portion when the bolt is tightened. Accordingly, the spacer allows the compression ratio of the seal to be regulated and allows the seal to be compressed in a suitable manner.

EMBODIMENTS OF THE INVENTION

One embodiment of a battery pack 10 will now be described.

Figure 1A:
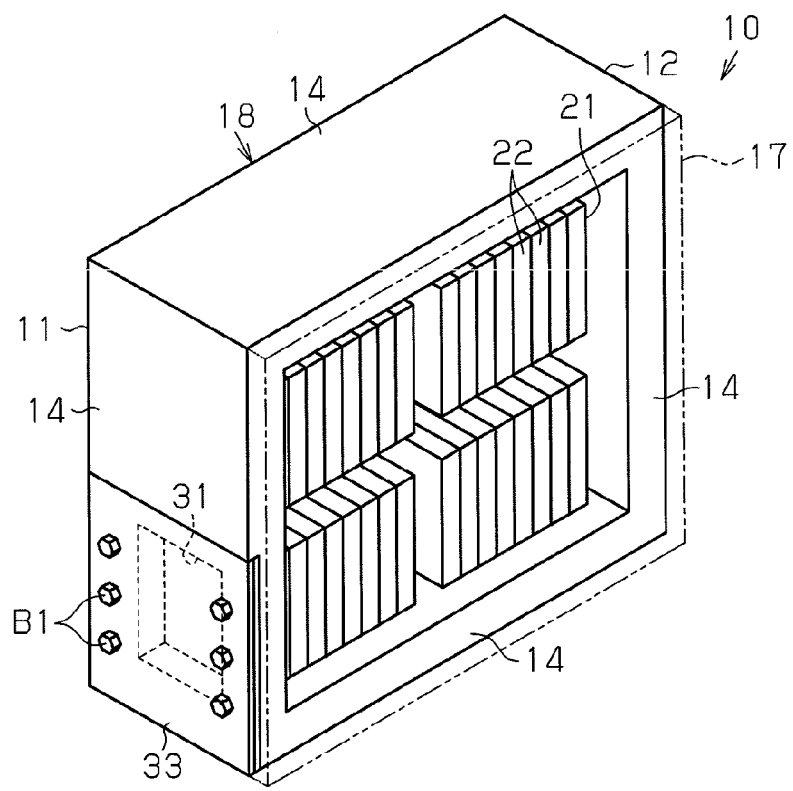
FIG. 1A is a perspective view showing one embodiment of a battery pack.

As shown in FIG. 1A, the battery pack 10 includes a case 11 and battery modules 21, which are accommodated in the case 11. Each battery module 21 includes battery cells 22. The case 11 includes a frame 18 and a lid 33. The frame 18 includes a rectangular through hole 31. The lid 33 is a rectangular plate that closes the through hole 31.

The frame 18 includes a main body 12 having the form of a square box. The main body 12 includes an opening, a bottom wall (not shown), and four side walls extending from the edges of the bottom wall. The frame 18 further includes a flat plate 17 that covers the opening of the main body 12. The main body 12 and the flat plate 17 are joined with each other by, for example, an adhesive.

Figure 1B:
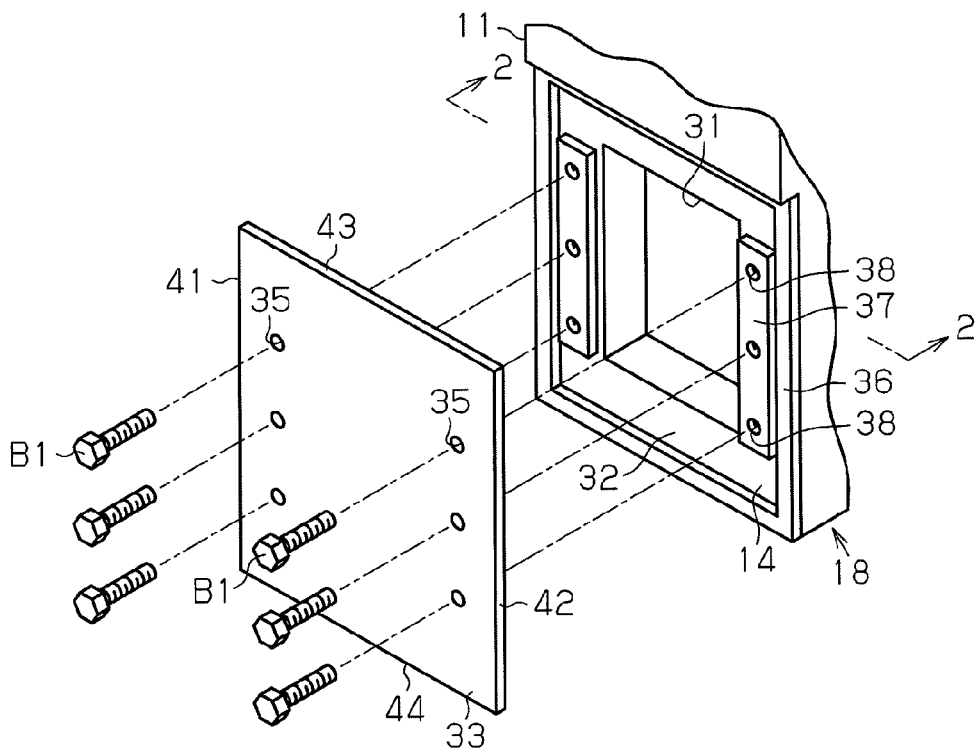
FIG. 1B is an exploded perspective view showing a through hole and a lid of the battery pack of FIG. 1A.

As shown in FIGS. 1A and 1B, one of the four side walls 14 include the through hole 31. A portion of the frame 18 (specifically, one side wall 14 of main body 12) defining the through hole 31, that is, the portion surrounding the through hole 31 is referred to as a through hole surrounding portion 32. The through hole 31 is closed by the lid 33, which is fixed to the through hole surrounding portion 32.

Figure 2:
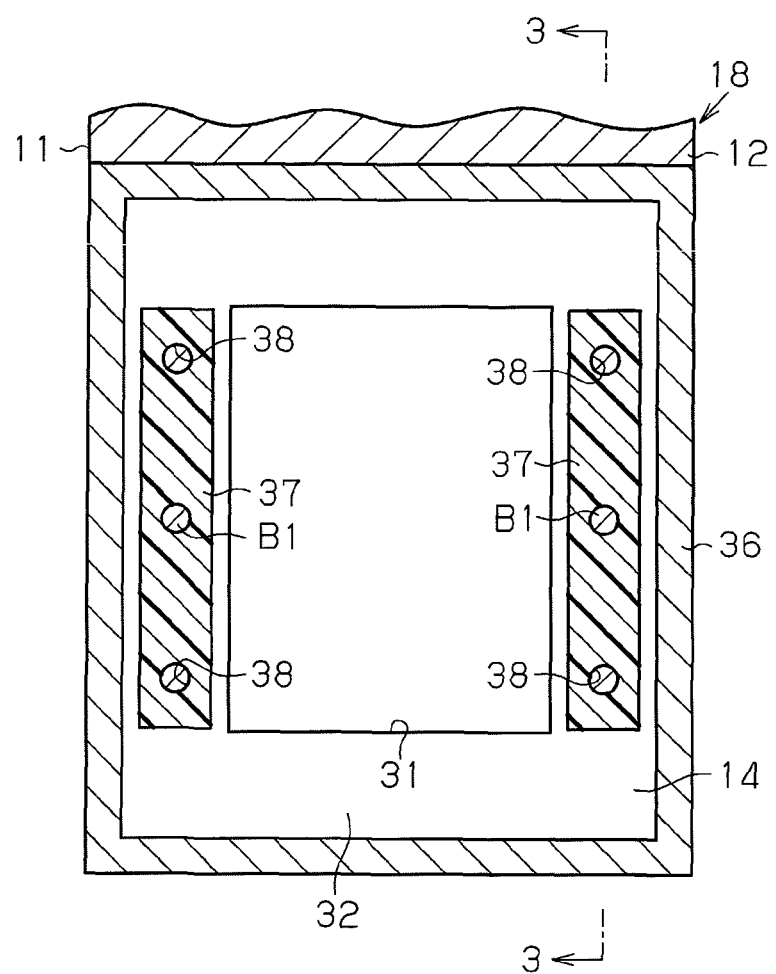
FIG. 2 is a cross-sectional view taken along line 2-2 in FIG. 1B.
Figure 3:
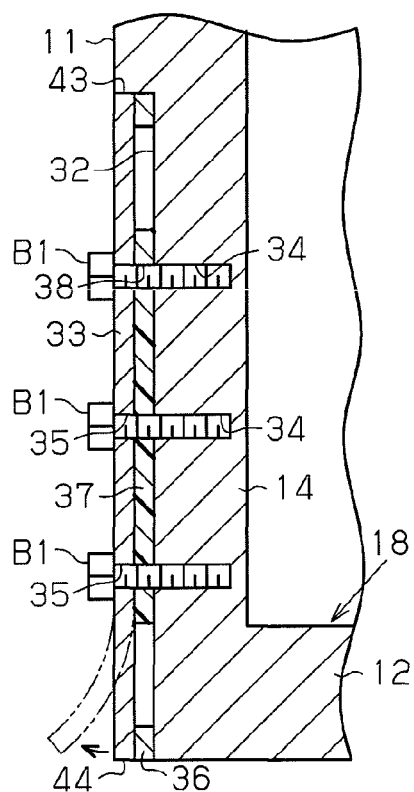
FIG. 3 is a cross-sectional view taken along line 3-3 in FIG. 2.

As shown in FIGS. 2 and 3, the through hole surrounding portion 32 includes fastening holes 34. The wall surface defining each fastening hole 34 is threaded. The fastening holes 34 are located at opposite sides of the through hole 31. More specifically, the fastening holes 34 are located in the through hole surrounding portion 32 at parts corresponding to the two lateral ends of the through hole 31. Three fastening holes 34 are aligned at each side of the through hole 31 in the longitudinal direction of the through hole 31. The lid 33 includes insertion holes 35 that correspond to the fastening holes 34 and extend through the lid 33 in the thickness-wise direction. In the description hereafter, among the four ends 41 to 44 of the lid 33, the ends corresponding to the two opposing long sides are referred to as the first end 41 and the second end 42, and the ends corresponding to the two opposing short sides are referred to as the third end 43 and the fourth end 44.

As shown in FIGS. 1A and 1B, the insertion holes 35 are arranged at the first ends 41 and the second ends 42. Three insertion holes 35 are aligned along each of the sides of the first end 41 and the second end 42 (long sides of lid 33). The insertion holes 35 are not arranged at the corners of the lid 33. The insertion holes 35 are aligned in the direction in which the third end 43 and the fourth end 44 are opposed to each other (direction from third end 43 to fourth end 44). That is, the two lateral ends of the lid 33 include the insertion holes 35. The third end 43 and the fourth end 44 do not include the insertion holes 35.

As shown in FIGS. 2 and 3, a seal 36 and two spacers 37 are arranged between the lid 33 and the through hole surrounding portion 32. The seal 36 has the form of a square frame and is in contact with the entire peripheral region of the lid 33 to hermetically seal the case 11. Each spacer 37 is located toward the inner side from the portion of the lid 33 that contacts the seal 36. The spacers 37 are formed from resin and have a higher deformation resistance than the seal 36. In this manner, the spacers 37 are each located at the inner side of the seal 36. The two spacers 37, each having the form of a rectangular plate, are located at the two sides of the through hole 31 respectively opposing the first end 41 and the second end 42 of the lid 33. That is, the two spacers 37 are extended in the longitudinal direction of the lid 33 and located between the through hole surrounding portion 32 and the first and second ends 41 and 42 of the lid 33. Each spacer 37 includes three insertion holes 38 corresponding to the fastening holes 34 and the insertion holes 35. Further, each spacer 37 functions to maintain a gap between the lid 33 and the through hole surrounding portion 32.

The lid 33, the two spacers 37, and the through hole surrounding portion 32 are arranged so that the insertion holes 35, the insertion holes 38, and the fastening holes 34 are in alignment. Bolts B1 are inserted through the insertion holes 35 of the lid 33 and the insertion holes 38 of the spacers 37 and fastened to the fastening holes 34 to fix the lid 33, the seal 36, and the two spacers 37 to the through hole surrounding portion 32. In this manner, the bolts B1 are inserted through each spacer 37.

Figure 4:
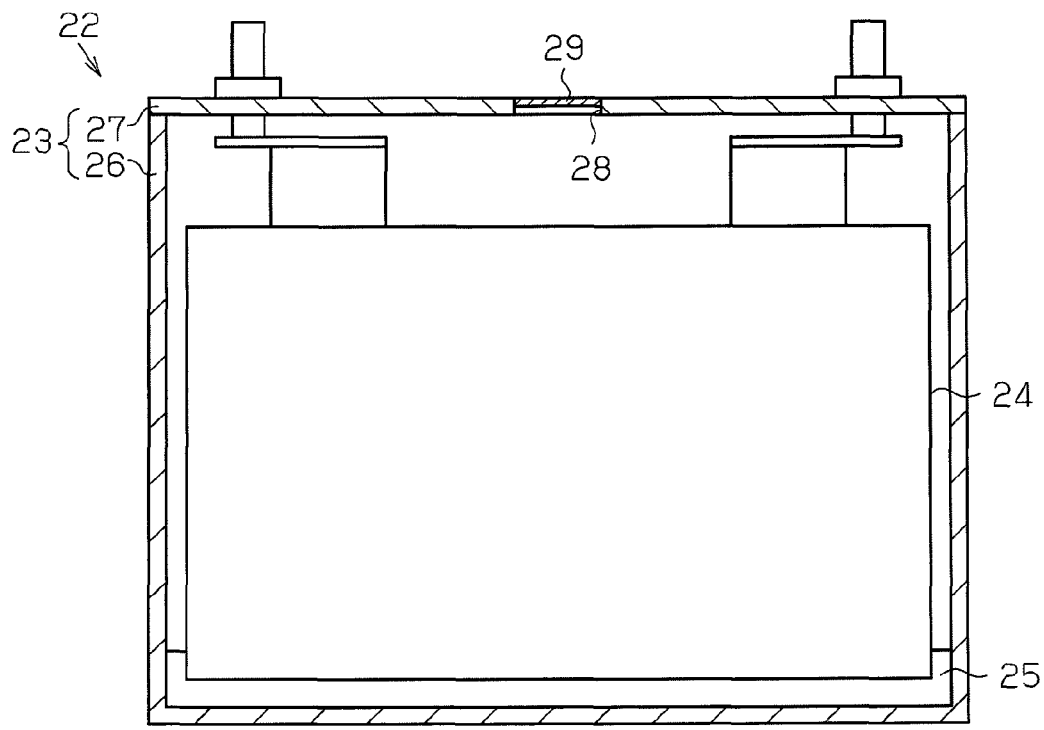
FIG. 4 is a cross-sectional view showing the battery cell of FIG. 1A.

As shown in FIG. 4, each battery cell 22 (e.g., rechargeable lithium-ion or nickel-metal hydride battery) includes a battery case 23. An electrode assembly 24 and an electrolytic solution 25 are accommodated in the battery case 23. The battery case 23 includes a box-shaped case body 26, which accommodates the electrode assembly 24 and includes an opening and a bottom wall, and a cap 27, which has the form of a rectangular plate and closes the opening of the case body 26. The cap 27 includes a hole 28 extending through the cap 27 in the thickness-wise direction. A discharge valve 29 arranged in the hole 28 opens when the internal pressure of the battery case 23 exceeds a specified pressure. The "specified pressure" is set at a pressure that ruptures the discharge valve 29 before the battery case 23 is damaged.

The operation of the battery pack 10 in the present embodiment will now be described.

When an abnormality occurs in a battery cell 22 and opens the corresponding discharge valve 29, gas is discharged into the case 11 from the battery case 23. The gas discharged from the battery cell 22 raises the internal pressure of the case 11. As shown in FIG. 3, when the internal pressure of the case 11 rises to a predetermined pressure, the third end 43 and the fourth end 44 of the lid 33 are deformed in a direction in which the third end 43 and the fourth end 44 are separated from the through hole surrounding portion 32 (broken lines in FIG. 3 show deformation of only fourth end 44). In detail, the deformed portions extend from the portion where the bolts B1 closest to the third end 43 are located to the side of the third end 43 and from the portion where the bolts B1 closest to the fourth end 44 are located to the side of the fourth end 44. When the internal pressure of the case 11 rises to the predetermined pressure, portions of the lid 33 located further toward the outer side from the longitudinally outermost bolts B1 are deformed in a direction in which the portions are separated from the through hole surrounding portion 32. In this manner, portions of the lid 33 are deformed to release gas from the case 11. The "predetermined pressure" is set to be lower than the pressure that ruptures the case 11. The lid 33 partially functions as a pressure relief valve to relieve the pressure of the case 11.

The two spacers 37 are located between the lid 33 and the through hole surrounding portion 32 in correspondence with the portions where the bolts B1 are inserted. Thus, when the bolts B1 are fastened, the spacers 37 restrict the tightening of the bolts B1. The force applied to the seal 36 through the lid 33 when the bolts B1 are tightened may be regulated by the relationship between the deformation resistance of the spacers 37 and the deformation resistance of the seal 36, the positional relationship of the spacers 37, the seal 36, and the bolts B1, the relationship between the thickness of the spacers 37 and the thickness of the seal 36, and the like. Thus, the compression ratio of the seal 36 may be regulated and excessive or insufficient compression of the seal 36 may be avoided by the selection of the thickness of the spacers 37, the deformation resistance of the spacers 37, and the locations of the spacers 37.

The above embodiment has the advantages described below.

(1) The spacers 37 are located between the lid 33 and the through hole surrounding portion 32. The spacers 37 allow the compression ratio of the seal 36 to be regulated. Thus, when tightening the bolts B1, situations may be avoided in which the compression of the seal 36 is insufficient or excessive. This allows the seal 36 to be compressed in a suitable manner.

(2) The spacers 37 have a higher deformation resistance than the seal 36. Thus, the tightening of the bolts B1 may be regulated in a suitable manner, and excessive compression of the seal 36 may be avoided.

(3) The seal 36 is in contact with the entire peripheral region of the lid 33. The spacers 37 are located toward the inner side from the seal 36. That is, the spacers 37 are located toward the inner side from the portions where the seal 36 contacts the lid 33. Thus, the spacer 37 is surrounded by the seal 36 and not exposed to ambient air. This impedes deterioration of the spacers 37.

(4) A plurality of the bolts B1 are inserted through each spacer 37. When a separate spacer 37 is provided for each bolt B1, the spacer 37 may be displaced before the bolt B1 is tightened and cause difficulties when the bolt B1 is tightened. The tightening of the bolts B1 is facilitated when a plurality of the bolts B1 share the same spacer 37 like in the present embodiment.

(5) The spacers 37 are formed from resin. Thus, the spacers 37 do not rust. This avoids situations in which rust on the lid 33 and the through hole surrounding portion 32 interferes with the deformation of the lid 33.

(6) A seal (e.g., O-ring) may be fitted into an annular groove formed in at least one of the lid 33 and the through hole surrounding portion 32. In such a structure, rust may cause the lid 33 to become stuck to the through hole surrounding portion 32 and interfere with deformation of the lid 33. The spacers 37 arranged between the lid 33 and the through hole surrounding portion 32 maintain the gap between the lid 33 and the through hole surrounding portion 32 and decrease the area of contact between the lid 33 and the through hole surrounding portion 32. This avoids situations in which rust fixes the lid 33 to the through hole surrounding portion 32.

The above embodiment may be modified as described below.

In the above embodiment, the spacers 37 may be formed from metal. In this case, the seal 36 is also in contact with the entire peripheral region of the lid 33. Thus, exposure of the spacers 37 to the ambient air is restricted. This avoids situations in which rust forms on the metal spacers 37 and causes the lid 33 and the through hole surrounding portion 32 to be stuck to the spacers 37. Even when the spacers 37 rust, the spacers 37 are located toward the inner side from the seal 36. Thus, deformation of the lid 33 is subtly affected, and the influence of rust is small.

The spacers 37 may be located toward the outer side from the seal 36. In this case, it is preferred that the spacers 37 are formed from a resin or the spacers 37 are formed by applying a resin coating to metal in order to restrict the formation of rust.

In the above embodiment, a side wall 14 of the frame 18 includes the through holes 31, and the seal 36 and the spacers 37 are located between the lid 33 and the through hole surrounding portion 32 of the side wall 14. However, through holes may be located anywhere in the frame 18. That is, the seal 36 and the spacers 37 need only be located between a through hole surrounding portion and a lid, which closes a through hole.

The spacers 37 may be members having a lower deformation resistance than the seal 36.

A spacer 37 that receives only one bolt B1 may be used.

The spacers 37 may have any shape. For example, a frame-like spacer that surrounds the through hole 31 may be used. The number of the spacers 37 is not limited to two and may be greater than two or less than two.

In the above embodiment, the bolts B1 are all inserted through the spacers 37. Instead, only some of the bolts B1 may be inserted through the spacers 37. For example, bolts B1 that are inserted through the spacers 37 and bolts B1 that are not inserted through the spacers 37 may be alternately arranged. Further, the bolts B1 need not be inserted through the spacers 37.

The set of the through hole 31 and the lid 33 may be increased in number, and the seal 36 and the spacers 37 may be arranged between each through hole surrounding portion 32 and the corresponding lid 33.

The invention claimed is:

1. A battery pack comprising:
 a case including a frame, which has a through hole, and a lid, which is fixed to the frame to close the through hole, wherein the frame includes a through hole surrounding portion that surrounds the through hole, the lid is fixed to the through hole surrounding portion by a bolt, and when an internal pressure of the case rises, a portion of the lid is deformed in a direction in which the portion is separated from the through hole surrounding portion to relieve the internal pressure;
 a battery cell accommodated in the case;
 a seal located between the lid and the through hole surrounding portion to hermetically seal the case; and
 a spacer located between the lid and the through hole surrounding portion to maintain a gap between the lid and the through hole surrounding portion, the spacer encompassed by the seal and being positioned so as to not overlap with the seal when viewed in a direction extending along a longitudinal axis of the bolt.

2. The battery pack according to claim 1, wherein the spacer has a higher deformation resistance than the seal.

3. The battery pack according to claim 1, wherein the seal is configured to be in contact with an entire peripheral region of the lid.

4. The battery pack according to claim 1, wherein the spacer is located inwardly of the seal.

5. The battery pack according to claim 1, wherein the spacer is located inwardly of a portion of the lid that contacts the seal.

6. The battery pack according to claim 1, wherein a plurality of the bolts extend through the spacer.

7. The battery pack according to claim 1, wherein the spacer comprises a resin.

8. The battery pack according to claim 1, wherein the spacer is one of two spacers extending parallel to each other at opposite sides of the through hole.

9. The battery pack according to claim 1, wherein the spacer is surrounded by the seal so as to not be exposed to ambient air.

10. The battery pack according to claim 1, wherein the spacer maintains a gap between the lid and the through hole surrounding portion and decreases an area of contact between the lid and the through hole surrounding portion.

* * * * *